US007496629B2

(12) United States Patent
Niikura et al.

(10) Patent No.: US 7,496,629 B2
(45) Date of Patent: Feb. 24, 2009

(54) COMMUNICATION APPARATUS AND COMMUNICATION CONTROL METHOD IN THE APPARATUS

(75) Inventors: Yasuhito Niikura, Chiba (JP); Toru Fujino, Chiba (JP); Fumio Shoji, Chiba (JP); Taro Tsuchida, Ibaraki (JP); Masahiro Odaira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 10/420,801

(22) Filed: Apr. 23, 2003

(65) Prior Publication Data
US 2003/0212757 A1  Nov. 13, 2003

(30) Foreign Application Priority Data
Apr. 26, 2002  (JP)  ............................. 2002-127272

(51) Int. Cl.
*G06F 15/16* (2006.01)
(52) U.S. Cl. ...................................... 709/206; 709/217
(58) Field of Classification Search ................. 709/217, 709/203, 206
See application file for complete search history.

(56) References Cited

U.S. PATENT DOCUMENTS

| 5,765,033 A | * | 6/1998 | Miloslavsky | 709/206 |
| 5,805,810 A | * | 9/1998 | Maxwell | 709/206 |
| 6,094,277 A | * | 7/2000 | Toyoda | 358/1.15 |
| 6,128,101 A | * | 10/2000 | Saito | 358/402 |
| 6,952,721 B2 | * | 10/2005 | Tonegawa | 709/206 |
| 7,016,938 B1 | * | 3/2006 | Quine | 709/206 |
| 2002/0012424 A1 | * | 1/2002 | Nishio et al. | 379/100.06 |

FOREIGN PATENT DOCUMENTS

| JP | 11-68829 | * | 3/1999 |
| JP | 11068829 | | 3/1999 |
| JP | 11-328060 | | 11/1999 |

* cited by examiner

*Primary Examiner*—Larry D Donaghue
*Assistant Examiner*—Brian J Gillis
(74) *Attorney, Agent, or Firm*—Fitzpatrick, Cella, Harper & Scinto (57) ABSTRACT

A communication apparatus capable of communicating with a server connected to the apparatus via a network. When a mail message is received from a POP3 server, it is determined whether or not an error exits in the mail message. If it is determined that an error exits, unique ID of the mail message is registered. If a number of a mail message having the same unique ID as the registered unique ID is received, reception of the mail message is rejected.

15 Claims, 9 Drawing Sheets

ERROR INFORMATION OF POP3 ACOUNT 1

| Flag | UniqueID | ERROR INFORMATION |
|---|---|---|
| 1 | a58b63e45387599fb1cfb96f18ce27d2 | 820 |
| 0 | 70265701 05a1654f725a22d6a4b7d9de | 831 |
| 0 | 0 | 0 |
| ......... | ............ | |
| 0 | 0 | 0 |
| 0 | 0 | 0 |
| 0 | 0 | 0 |

FIG. 5

500 — OK QPOP(version 2.53)
501 — user Kanon
502 — +OK Password required for comen01.
503 — pass *****
504 — +OK Kanon has 6 messages(270460 octets).
505 — stat
506 — +OK 6 270460
507 — list 1
508 — +OK 1 456
509 — uidl 1
510 — +OK 1 a58b63e45387599fb1cfb96f18ce27d2
511 — retr 1

512 {
+OK 444 octets
>From bin Fri Dec 14 10:06:47 2001
Received: from aaa(IDENT:niikura@ifax-linux.ifax.tcp.kanon.co.jp [127.0.0.1])
    by ifax-linux.tcp.kanon.co.jp(8.9.3/3.7W)with SMTP id KAA03355
    for comet01; Fri, 14 Dec 2001 10:06:24 +0900
Date: Fri, 14 Dec 2001 10:06:24 +0900
From: abcd
Message-Id: <200112140106.KAA03355@ifax.linux.ifax.tcp.kanon.co.jp>
X-UIDL:a58b63e45387599fb1cfb96f18ce27d2 aaaa
bbbb
cccc
dddd
eeee
ffff
gggg

513 — uidl 2
514 — +OK 2 7026570105a1654f725a22d6a4b7d9de
uidl 3
+OK 3 fcd8f43260fed135319982731e47ab39
uidl 4-
+OK 4 450219290e908708c9be1279ae6e5c60
uidl 5
+OK 5 a608271d287c4216829c0f03e8204185
uidl 6
+OK 6 5c56644e6599ffd38e55d22a79590694
515 — quit
+OK Pop server signing off.
Connection closed by foreign host.

COMMUNICATION APPARATUS AND COMMUNICATION CONTROL METHOD IN THE APPARATUS

FIELD OF THE INVENTION

The present invention relates to a communication apparatus capable of communicating with a server connected to the apparatus via a network and a communication control method in the apparatus.

BACKGROUND OF THE INVENTION

A communication apparatus, connected to a network such as the Internet, which receives a mail transmitted from a server via the network by a POP3 procedure is known. In this communication apparatus, first, account authentication is performed between the apparatus and the server by using an account name and a password. When the account authentication has been completed, an inquiry is made about information in a mail box by using POP3 START command. If there is message information in the mail box, a message number is obtained by using POP3 LIST command by the number of messages, and the processing of downloading of mail message in correspondence with the obtained message number is repeated by utilizing POP3 RETR command.

Then, it is determined whether or not the obtained mail message can be printed by the communication apparatus. If the message can be printed, it is printed, otherwise, error information is printed as a report. However, in a case where the mail message stored in the mail box of the POP3 server has been downloaded in the above-described manner and the downloading of mail message from the mail box is performed again, the following problem occurs.

That is, an unprintable mail message is obtained from the server repeatedly, and as a result, error information is printed repeatedly. In this manner, a number of wasteful works occur due to repeated acquisition of unnecessary message and repeated printing of error information due to the acquisition of unnecessary message.

To solve the problem, in Japanese Published Unexamined Patent Application No. Hei 11-328060, for example, a mail message stored in a mail server is downloaded and a file attached to the mail is downloaded, then if the format of the file attached to the electronic mail is not permissible, identification information of the latest remaining mail is stored as a remaining ID, and the number of remaining mails (K) in the server at that time is stored. Upon next message acquisition, the K-th message ID and the remaining mail ID are compared with each other. If they correspond with each other, an electronic mail later than the K-th mail is received.

However, in this electronic-mail type facsimile apparatus, where the latest remaining message ID and the number of mails in the server are stored, then the K-th message ID in the server and the stored remaining message ID are compared, and a new (K+1)th electronic mail is received if the IDs correspond with each other, if the server does not always process a newly-received mail as a (K+1) mail, or if the order of reception is not stored in the server for some reason, a new electronic mail cannot be obtained.

Further, in a case where the reception of the K-th electronic mail is not permissible because of shortage of memory in the mail receiving-side apparatus, even if a sufficient memory area can be ensured upon completion of printing of already-received mail or memory expansion on the mail receiving-side apparatus, the next mail access is performed on the (K+1) electronic mail, and the previous unreceived electronic mails including the K-th mail cannot be received.

SUMMARY OF THE INVENTION

The present invention has been made in consideration of the above prior art, and has its object to provide a communication apparatus and a communication control method in the apparatus which prevent repeated printing of error information due to repeated reception of error message data in a server connected to the apparatus via a network.

Further, another object of the present invention is to provide a communication apparatus and a communication control method in the apparatus which reliably obtain a mail newly received in a server regardless of processing method of the server.

Further, another object of the present invention is to provide a communication apparatus and a communication control method in the apparatus which receive an electronic mail if the reason why reception of the electronic mail is not permissible is solved.

Further, another object of the present invention is to provide a communication apparatus and a communication control method in the apparatus which effectively utilize an error message ID storage area.

According to the present invention, the foregoing object is attained by providing a communication apparatus capable of communicating with a server connected to the apparatus via a network, comprising:

number of message information acquisition means for acquiring information indicating the number of mail messages in the server;

identification information acquisition means for acquiring identification information of a mail message in the server;

reception means for receiving a mail message in the server;

judgment means for judging whether or not the mail message is processible;

registration means for registering plural identification information of mail messages judged by the judgment means as unprocessible;

comparison means for comparing the plural identification information registered in the registration means with the identification information of the mail message acquired by the identification information acquisition means; and control means for controlling the identification information acquisition means to acquire all the mail messages in the server based on the information indicating the number of mail messages in the server acquired by the number of message information acquisition means, and controlling the comparison means to perform comparison, and inhibiting reception of all the mail messages having identification information matching with the identification information registered in the registration means.

Other features and advantages of the present invention will be apparent from the following description taken in conjunction with the accompanying drawings, in which like reference characters designate the same name or similar parts throughout the FIGS. thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
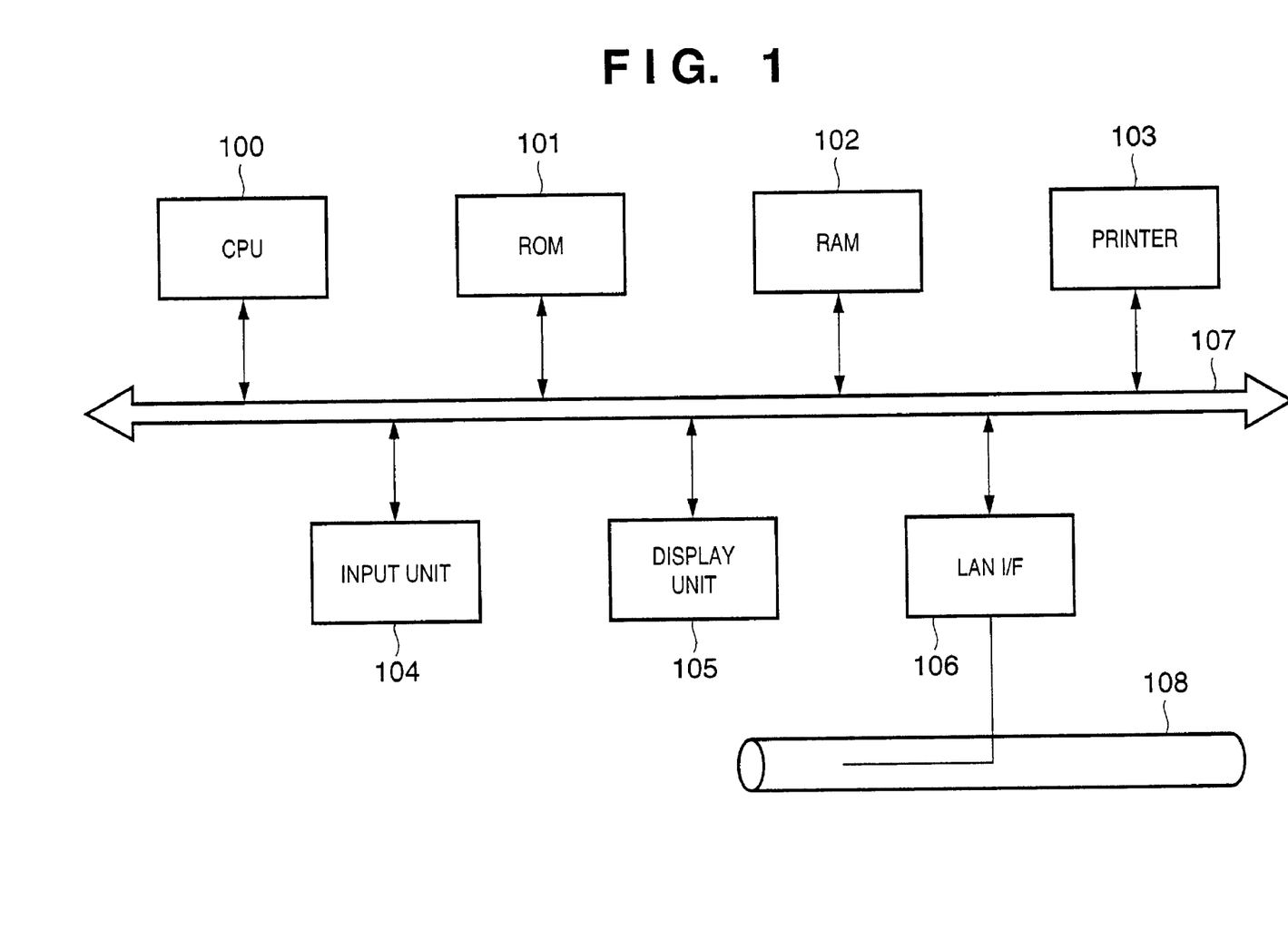
FIG. 1 is a block diagram showing the construction of a communication apparatus according to an embodiment of the present invention.

FIG. 1 is a block diagram showing the construction of a communication apparatus according to an embodiment of the present invention. The communication apparatus is communicating with POP3 server connected to the apparatus via a network.

In FIG. 1, reference numeral 100 denotes a CPU which controls the operation of the entire communication apparatus in accordance with a control program stored in a ROM 101 and various data; 102, a RAM which is used as a work area for storing various data upon control operation by the CPU 100 and which holds data inputted via a LAN interface 106; 103, a printer which prints various data, received data, report data and the like stored in the RAM 102 under the control of the CPU 100; 104, an input unit having a pointing device such as a keyboard and a mouse, which is operated by an operator for inputting various data and commands; 105, a display unit having a display screen such as a CRT or a liquid crystal, which is used for realizing GUI with the operator; 106, the LAN interface for data transmission/reception with the server and other communication apparatuses via the network; 107, a system bus interconnecting the above-described respective constituent elements for data transmission/reception among these constituent elements; and 108, a LAN (Local Area Network).

Figure 2:
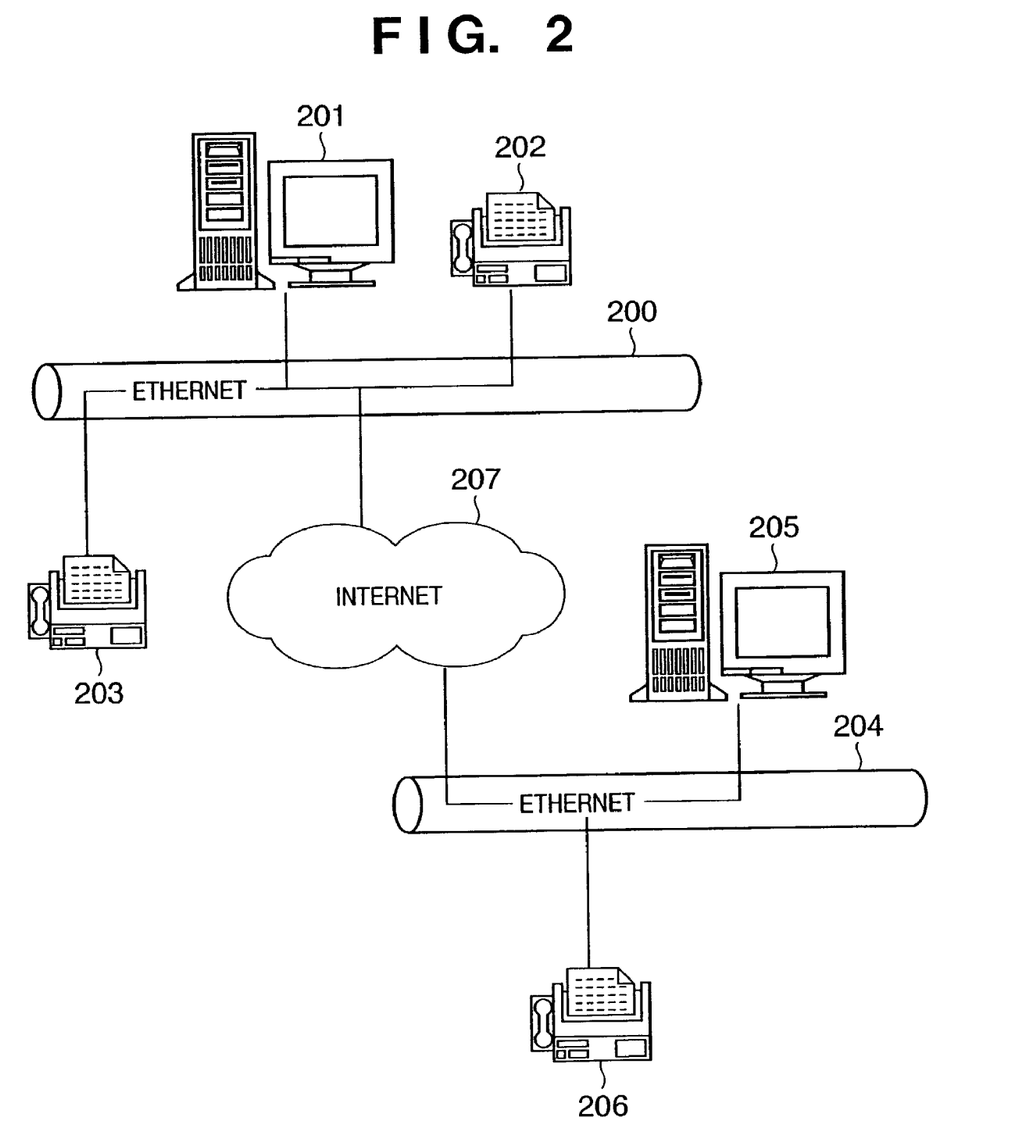
FIG. 2 is a conceptual diagram showing an example of a network environment including the communication apparatus according to the embodiment.

FIG. 2 is a conceptual diagram explaining the form of connection of the communication apparatus according to the present embodiment.

In FIG. 2, numeral 200 denotes Ethernet to which a server 201, a communication client apparatus 202 and a communication apparatus 203 according to the present embodiment are connected. The Ethernet 200 is connected to a global Internet 207. The server 201, capable of mail transmission/reception, receives a mail message sent from the communication client apparatus 202 or the Internet 207. Further, the server 201 performs mail reception by a POP3 procedure from the communication apparatus 203. The communication client apparatus 202 can send a mail message via the server 201 to the communication apparatus 203. Further the communication apparatus 203 is capable of POP3 reception from the server 201. Further, numeral 204 denotes Ethernet; 205, a server; and 206, a communication client apparatus. The Ethernet 204 is also connected to the global Internet 207. The functions of the respective elements are the same as those of the above-described Ethernet 200, the server 201 and the communication client apparatus 202.

Figure 3A:
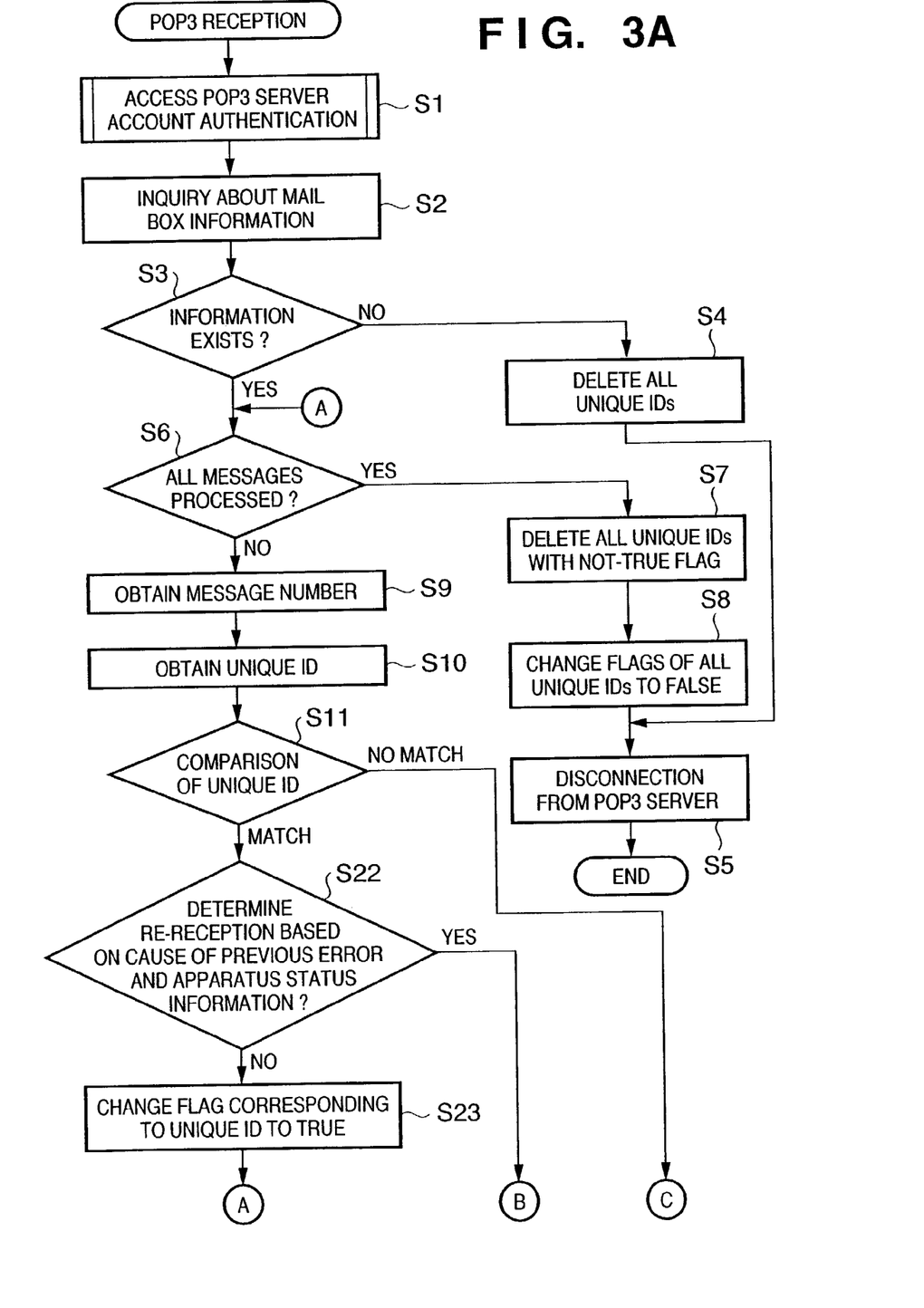
FIGS. 3A and 3B are flowcharts showing POP3 reception processing in the communication apparatus according to the embodiment.
Figure 3B:
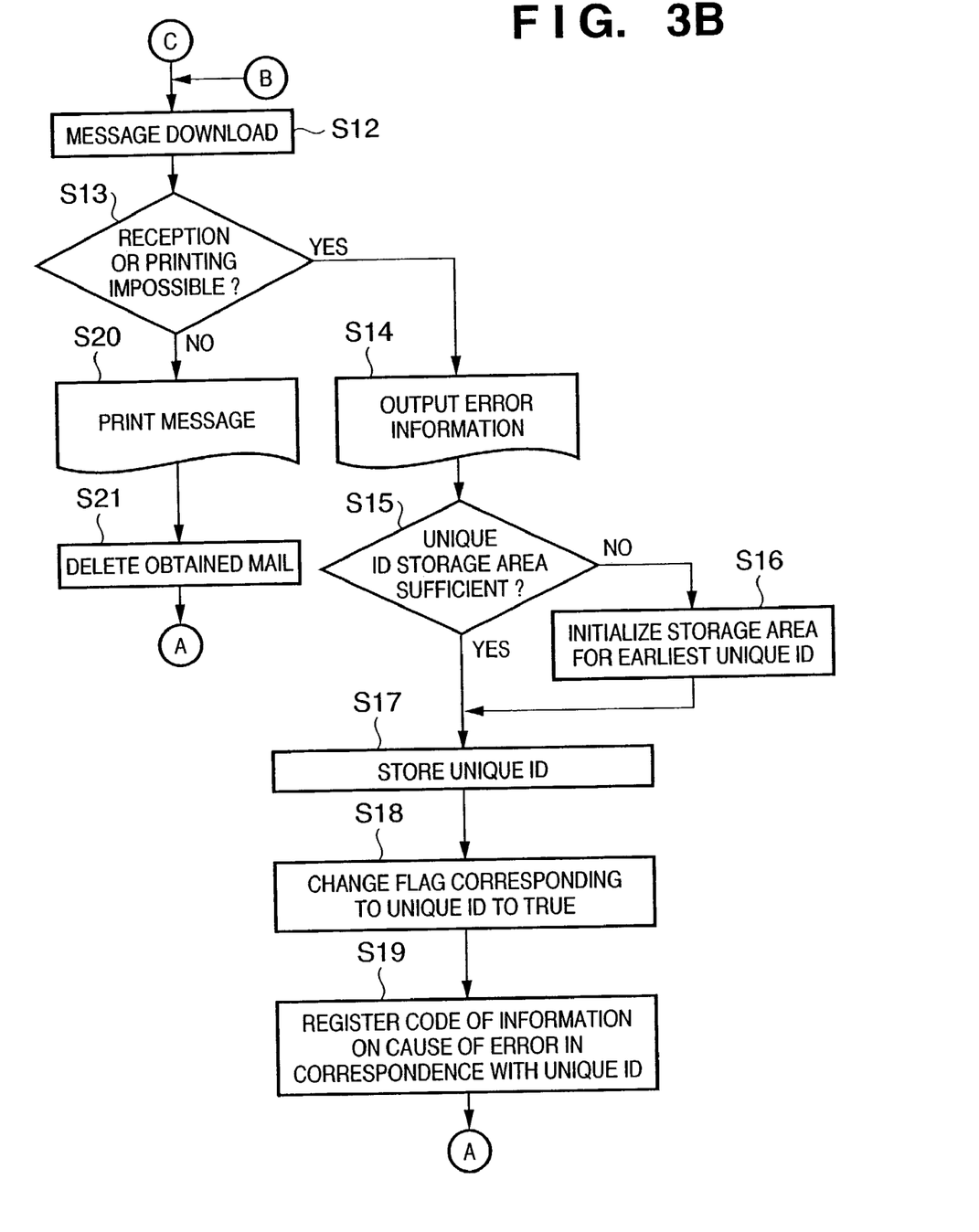

FIGS. 3A and 3B are flowcharts showing POP3 reception processing performed in the communication apparatus 203 according to the present embodiment. A program for execution of the processing is stored in the ROM 101.

Figure 4:
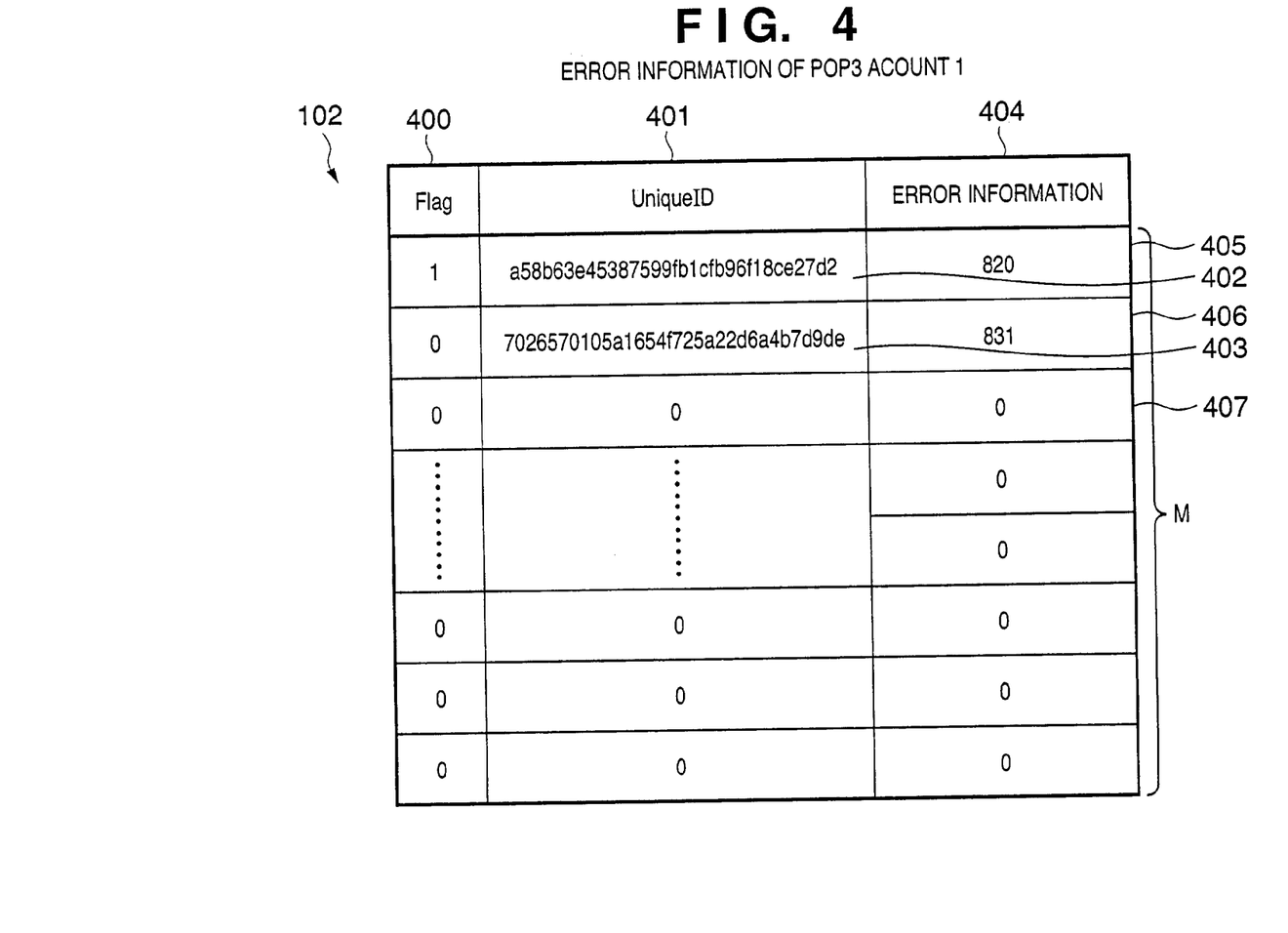
FIG. 4 shows a data structure of a table storing error information in the communication apparatus according to the embodiment.

First, at step S1, the communication apparatus 203 accesses the POP3 server 201 by the LAN interface 106 via the Ethernet 200. When the connection with the POP3 server 201 has been established, account authentication is performed by using an account name and a password. Next, at step S2, an inquiry is made about information in a mail box of the POP3 server 201 by using POP3 STAT command. This inquiry is made by using the STAT command as described later in FIG. 5. At step S3, it is checked whether or not message information exists in the mail box based on a response to the inquiry returned from the server 201. If message information exists, the process proceeds to step S6, while if message information does not exist, the process proceeds to step S4. The response returned from the server includes the total number of messages and capacity to be described later in FIG. 5. At step S4, as the response indicates that all the mail messages in the POP3 server 201 have been deleted, all the "POP3 account 1 error information" stored in the RAM 102 of the communication apparatus 203 shown in FIG. 4 is initialized, and the process proceeds to step S5. Note that a unique ID stored as an ID of a mail having an error in the RAM 102 as shown in FIG. 4 is deleted since message information having the unique ID has been already deleted from the server 201 by the administrator or the like of the server 201, thus wasteful control to obtain the message information of the unique information from the server 201 is prevented. Further, as unnecessary unique information is not stored but deleted, the RAM 102 as shown in FIG. 4 is effectively utilized, and a large memory capacity is not required.

The process proceeds to step S5, at which termination processing is performed on the POP3 server 201, to disconnect the apparatus from the POP3 server 201.

On the other hand, at step S3, if message information exists, the process proceeds to step S6, at which it is determined whether or not all the mail messages corresponding to the number of messages obtained at step S2 have been processed. If all the messages have been processed, the process proceeds to step S7, while if all the messages have not been processed, proceeds to step S9. At step S7, if a flag 400 of the "POP3 account 1 error information" as shown in FIG. 4 is "false" (0), it means that the mail message has been deleted in the POP3 server 201. Accordingly, the unique ID, of which the value of the flag 400 is "false" (0), is deleted from the table. This prevents wasteful control by the communication apparatus 203 to obtain the message information of unique information which has been deleted from the server 201. Further, in this arrangement, as unnecessary unique information is not stored, the RAM 102 as shown in FIG. 4 can be effectively utilized. Then the process proceeds to step S8, at which the flag 400 of the "POP3 account 1 error information" as shown in FIG. 4 is changed from "true" (1) to "false" (0). Thus, in the next cycle, upon mail acquisition in the POP3 server 201, if the corresponding mail message has been already deleted from the server 201 by the administrator of the server 201, as the flag is "false", all the unique IDs with "false" flag can be reliably deleted at step S7, and the RAM 102 can be effectively utilized. Then the process proceeds to step S5, at which termination processing is performed on the POP3 server 201, to disconnect the apparatus with the POP3 server 201.

FIG. 4 is an example of the error information in the POP3 account 1 stored in the RAM 102 of the communication apparatus 203 according to the present embodiment.

In FIG. 4, numeral 400 denotes the flag information indicating whether or not the error information is deleted in the POP3 server 201 (0=deleted (false)); and 401, a unique ID of the error-occurred message. As the error-occurred unique ID, a unique ID "a58b63e45387599fb1cfb9618ce27d2" 402 and a unique ID "7026570105a1654f725a22d6a4b7d9de" 403 are stored. The flag 400 of the unique ID 402 is set to "1" (not deleted in the POP3 server 201 (true)).

Further, at step S6, if all the message processing has not been completed, the process proceeds to step S9, at which message number information is obtained by using POP3 LIST command. The message number is given based on the total number of messages obtained at step S6. For example, if there are 6 messages, 1st to 6th message numbers are given. Further, "all the message processing" means that processing is performed for the total number of messages obtained at step S3. As described later in FIG. 5, LIST1 command is inputted, to make an inquiry to the POP3 server 201 about information on the first mail message 1. This operation is repeated such that the second message number information is obtained, then the third message number information is obtained, . . . , until all the message processing has been completed, i.e., the inquiry processing for the obtained total number of messages has been completed. Further, it is determined whether or not all the message processing has been completed based on decrement of total number of messages at step S6. Thus, newly-received mail information in the server 201 can be reliably obtained regardless of processing method of the server 201. Next, at step S10, the unique ID of the message is obtained by using POP3 UIDL command based on the message number obtained at step S9. Then the process proceeds to step S11, at which it is determined whether or not the unique ID of the message is already stored in the "POP3 account 1 error information" table in the RAM 102 of the communication apparatus 203 as shown in FIG. 4. If the unique ID is not stored in the table, the process proceeds to step S12, at which the mail message is downloaded by using POP3 RETR command.

Next, the process proceeds to step S13, at which the message obtained at step S12 is interpreted and it is determined whether or not the message is printable. If it is not printable, the process proceeds to step S14. The determination is made by determining whether or not the format of a file attached to the message can be mapped in the communication apparatus 203, whether or not an available capacity of the RAM 102 is sufficient to receive the message, whether or not the capacity for 1 message is equal to or less than a predetermined value, or the like. If the message is not printable, at step S14, a notification that the message is not printable is printed as error information by using the printer 103. Further, if the notification is printed in correspondence with information indicating the cause of the error to be described later and the unique ID, the user of the apparatus 203 and the administrator of the server 201 know the cause of the error of the message information and can handle the matter quickly. Note that in this example, if it is determined at step S11 as a result of comparison that the unique ID does not match any of the unique IDs in the table, the message is downloaded at step S12, however, as it is determined, by obtaining the capacity for the message by the LIST command at step S9, whether or not the available capacity of the RAM 102 is sufficient to receive the message, it may be arranged such that the memory capacity of the RAM 102 is determined without downloading the message and if the memory area is insufficient, the processing at step S14 and the subsequent steps is performed.

Next, the process proceeds to step S15, at which it is determined whether or not the storage area for unique ID is sufficient in the RAM 102. If the storage area is not sufficient, the earliest unique ID in the storage area is deleted. The determination as to the storage area for unique ID is made by determining whether or not M unique IDs are registered in the table as shown in FIG. 4. If M unique IDs are registered, data in a storage area of the earliest unique ID is deleted. Then, in the next cycle, in a case the POP3 server 201 is accessed for message acquisition, if it is determined at step S11 that the unique ID does not match any of the registered unique IDs, the message is downloaded at step S12. In the case of error, error information is outputted again.

In this arrangement, in a case where the administrator of the server 201 has forgotten to check unreceivable message, the administrator can be reminded of checking without printing of error information every time. Further, the limited capacity of the RAM 102 can be effectively utilized. Further, regarding a new unique ID of which a message has not been received, error information is not outputted upon each access to the server 201 for message acquisition. Further, in this example, the earliest unique ID is deleted, however, it may be arranged such that the earliest unique ID is not deleted but invalidated.

On the other hand, if it is determined at step S15 that the storage area for unique ID is sufficient, the process proceeds to step S17, at which the unique ID obtained at step S10 is stored in the available area of the table in FIG. 4. Then the process proceeds to step S18, at which the flag 400 of the unique ID stored at step S17 is changed to "true" (1) such that the unique ID is not deleted from the table at the above-described step S7. Further, at step S19, a code indicating the cause of error determined at the above-described step S13 is stored in an error information field 404 of the table in FIG. 4 in correspondence with the unique ID. Further, at step S6, the total number of messages is decremented, and the decremented value is set as a new total number of messages. In FIG. 4, "820" 405, "831" 406 are codes indicating causes of errors corresponding to the unique IDs 402 and 403. A code 407 indicates that no error has occurred.

Further, at step S13, if the message obtained at step S12 is printable, the process proceeds to step S20, at which the message obtained at step S12 is printed by using the printer 103. Then at step S21, the message obtained at step S12 is deleted from the POP3 server 201 by using POP3 DELE command, and further, at step S6, the total number of messages is decremented, and the decremented value is set as a new total number of messages.

Further, if it is determined at step S11 that the unique ID of the message obtained at step S10 is already stored in the "POP3 account 1 error information" table (FIG. 4) stored in the RAM 102, the process proceeds to step S22, at which it is determined whether or not reception is to be performed based on the previous error information and current status information of the apparatus 203. More particularly, in a case where the cause of the previous error indicates that the message has not received due to shortage of the memory capacity of the apparatus 203, the information stored in the memory is printed or transmitted, or memory expansion is performed, and it is determined whether or not the memory capacity is sufficient for the current reception, i.e., it is determined whether or not the previous error status has been solved. If the error status has been solved, the process proceeds to step S12, at which reception is performed. Note that the solution of error status includes a case where the previously-unreceivable format of a file attached to the message has become receivable by version change of the program in the communication apparatus 203. In this case, the process also proceeds to step S12 to perform re-reception.

On the other hand, if it is determined at step S22 that re-reception is not to be performed, the process proceeds to step S23, at which the flag 400 corresponding to the unique ID in the table is changed to "true" (1) such that the unique ID is not deleted from the table by the above-described processing at step S7. Further, at step S6, the total number of messages is decremented, and the decremented value is set as a new total number of messages.

Figure 7:
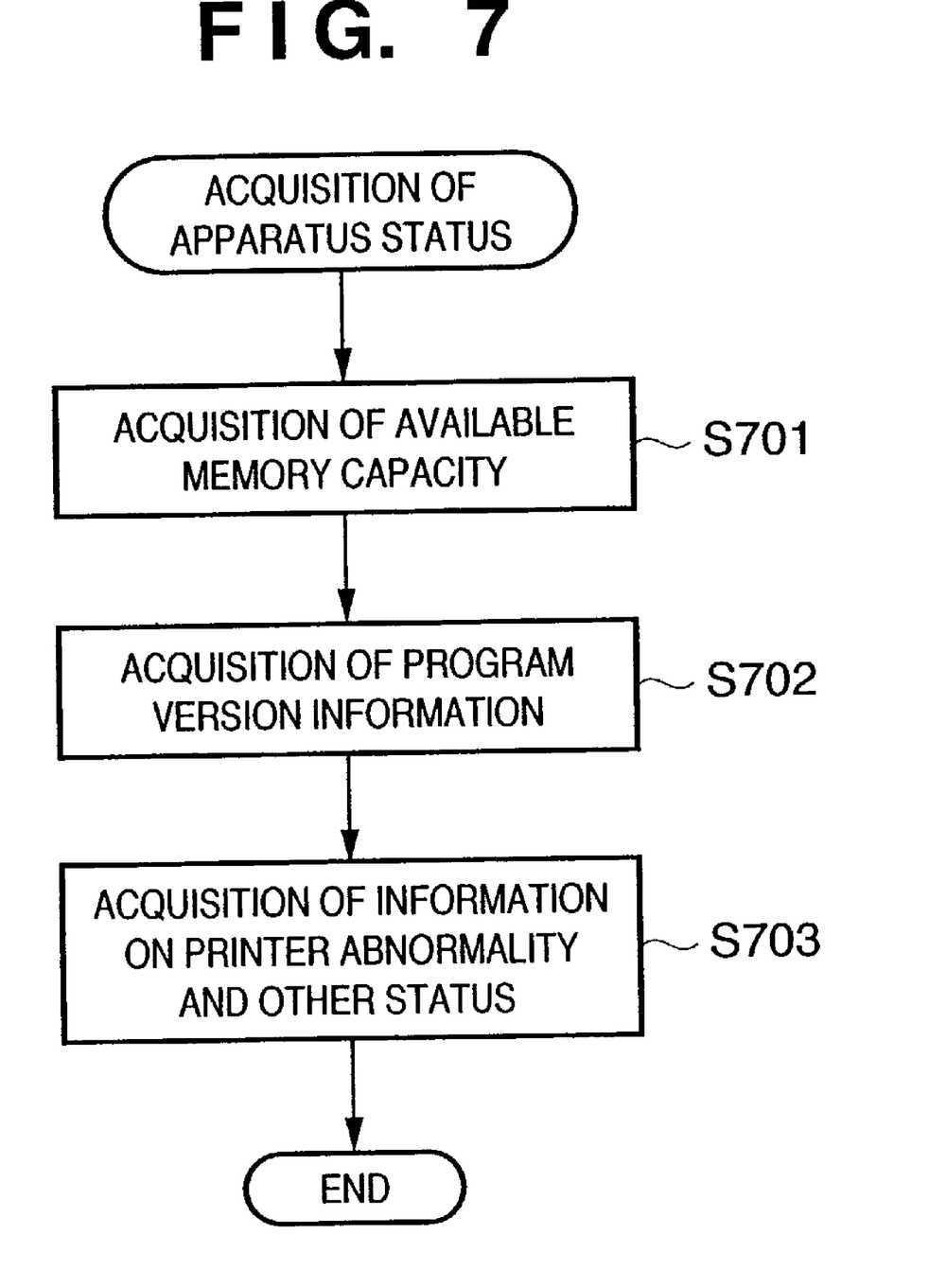
FIG. 7 is a flowchart showing a procedure for obtaining status information of the communication apparatus according to the embodiment.

FIG. 7 is a flowchart showing a procedure for obtaining status information of the communication apparatus 203 according to the present embodiment. A program for execution of the processing is stored in the ROM 101. The procedure is a task which is periodically started. It is started by, e.g., 5 msec.

First, at step S701, available memory capacity information of the RAM 102 is obtained, and the obtained memory capacity is written into a predetermined work area of the RAM 102. Then it is determined whether or not message information which has not been received due to shortage of memory can be received. Next, at step S702, the program version of the program stored in the ROM 101 is obtained, and the obtained version information is written into a predetermined work area of the RAM 102. Then it is determined whether or not the format of attached file which has been unreceivable by the program of the previous version is receivable by the program of the updated version. Note that in this example, the program version is periodically checked, however, it may be arranged such that the program version is checked only when the power is turned on. Next, at step S703, the various status information of the apparatus, including shortage of printing material such as toner or ink, printer abnormality such as paper jam, and an open status of apparatus cover (not shown), is obtained and written into a predetermined work area of the RAM 102. Thus, it is determined based on the updated information and the previous error information whether or not the cause of failure upon previous reception of message information has been solved. In this example, the processing has been explained as a periodical task, however, it may be arranged such that the task is called for determining whether or not reception or printing is impossible at step S13 in FIG. 3B. Further, it may be arranged such that the task is called immediately before the error cause information and the current apparatus status information are compared with each other at step S22. Otherwise, the task may be called in the combination of these cases.

Further, at the above-described step S15 (FIG. 3B), to call attention of the administrator of the server 201, the data in the storage area of the earliest unique ID is deleted if the storage area for unique ID is insufficient, however, the present invention is not limited to this arrangement.

Figure 8:
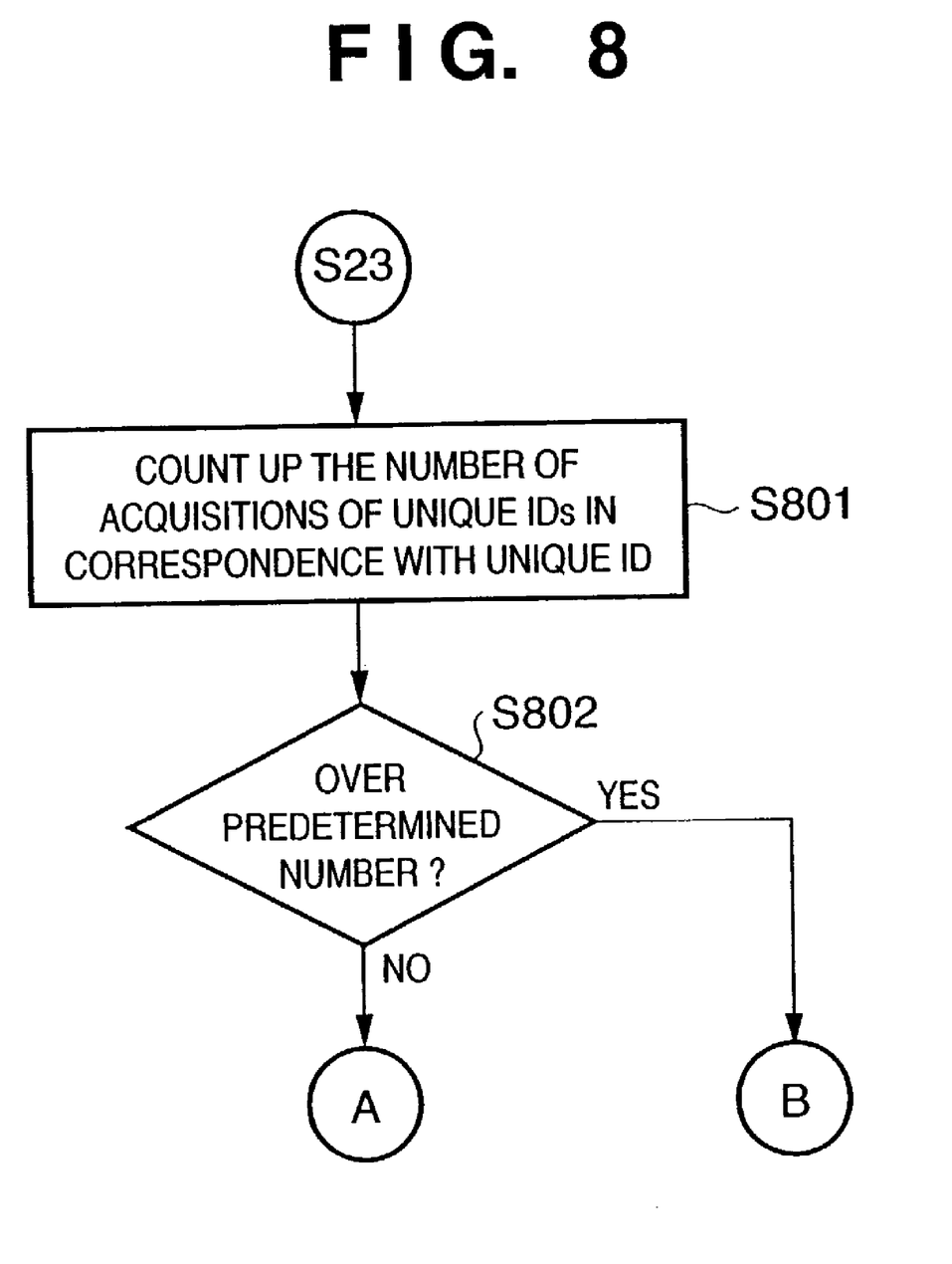
FIG. 8 is a flowchart showing a procedure for reminding a server administrator of error message information remaining in the server according to another embodiment the present invention.

FIG. 8 is a flowchart showing a procedure for reminding a server administrator of error message information remaining in the server according to another embodiment of the present invention, performed by the communication apparatus 203. Particularly, upon every message acquisition, at step S801 following step S23 in FIG. 3A, the number of cases where a corresponding unique ID exists is counted, and at step S802, it is determined whether or not the count value has exceeded a predetermined value. If the count value has exceeded the predetermined value, the process proceeds to step S12 in FIG. 3B to download the message. Note that the procedure as shown in FIG. 8 may be used in conjunction with steps S15 and S16 in FIG. 3B.

As described above, according to the present embodiment, when an error has occurred in a received mail message, the unique ID of the message is registered, and if the same message is received next, re-acquisition processing to re-download the unprintable message is not performed as long as it is determined at step S15 that the storage area for unique ID is sufficient or as long as it is determined at step S22 that re-reception is not to be performed. Thus re-downloading and re-printing of the error-occurred message can be prevented.

Further, the wasteful control by the communication apparatus 203 to obtain message information of unique information which has been deleted from the server 201 can be prevented. Further, since unnecessary unique information is not stored, the memory area of the RAM 102 as shown in FIG. 4 can be effectively utilized, and a RAM having a large memory capacity is not required.

Further, it is determined whether or not the storage area for unique ID is sufficient, and if the storage area is insufficient, the earliest unique ID in the storage area is deleted. When the POP3 server 201 is accessed for message acquisition in the next cycle, if an error occurs, error information is outputted again. Accordingly, even if the administrator of the server 201 has forgotten to check unreceivable message, the administrator can be reminded of checking without printing of error information every time. Further, the limited capacity of the RAM 102 can be effectively utilized.

Further, regarding a new unique ID of which a message has not been received, error information is not outputted upon each access to the server 201 for message acquisition.

Further, as it is determined based on the previous error information and the status information of the communication apparatus 203 whether or not re-reception is to be performed, if the cause of the previous error has been solved, message information can be automatically obtained. In a case where the processing as shown in FIG. 8 is also performed, it is stored in the ROM 101 holding the program.

Next, the processing in the communication apparatus 203 according to the present embodiment will be described with reference to the example of sequence in FIG. 5.

Figure 5:
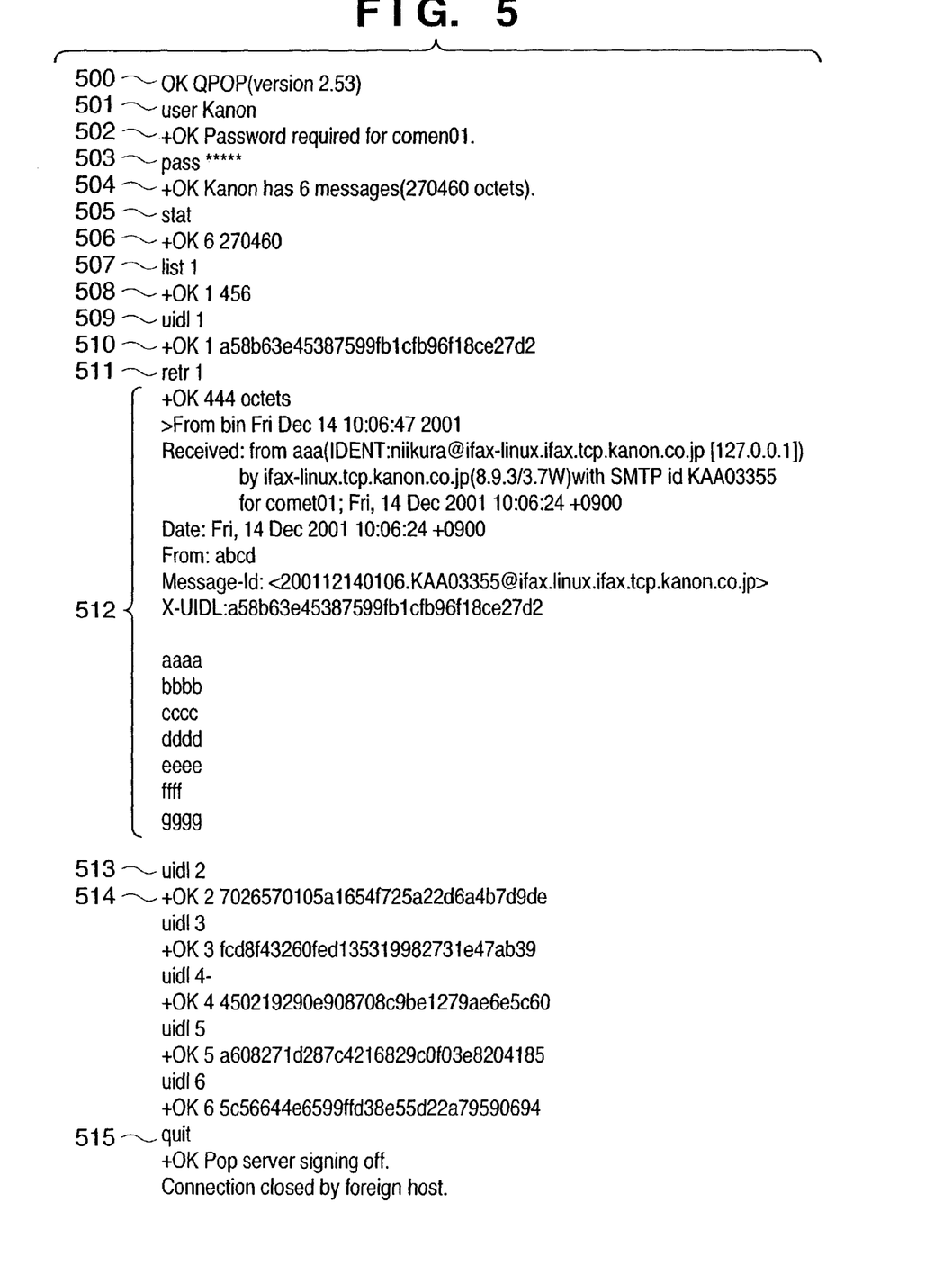
FIG. 5 is an example of data interchange sequence between the communication apparatus and a server according to the embodiment.

In FIG. 5, numeral 500 denotes a message from the POP3 server 201. The user of the communication apparatus 203 inputs an account name "kanon" (501). Next, a password is demanded from the server 201 (502). Then a designated password is inputted (503). Then the POP server 201 determines that the input account name and password are correct and returns a response notifying that 6 mail messages exist and the total capacity is "270460" in octal representation (504). The user of the communication apparatus 203 inputs the STAT command to make an inquiry to the POP3 server 201 about the mail box information (505). Then the total number of messages and data amount ("6" and "270460" in this example) are sent from the server 201 (506). Next, the user of the communication apparatus 203 inputs the LIST1 command to make an inquiry to the POP3 server 201 about information on the first mail message 1 (507). Then the capacity of the first message 1 (456) is sent from the server 201 (508). Next, the user of the communication apparatus 203 inputs UIDL1 command to demand the unique ID of the first mail message 1 for the POP3 server 201 (509). Then the unique ID of the mail message "a58b63e45387599fb1cfb9618ce27d2" (corresponding to "402" in FIG. 4) is sent from the server 201 (510).

Next, the user of the communication apparatus 203 inputs the RETR1 command to download the mail message 1 from the POP3 server 201. Then the message is sent from the server 201 to the communication apparatus 203 (512).

Similarly, the user of the communication apparatus 203 inputs UIDL2 command to demand the unique ID of the second mail message 2 for the POP3 server 201 (513). Then the unique ID of the second mail message "7026570105a1654f725a22d6a4b7d9de" (corresponding to "403" in FIG. 4) is sent from the server 201 (514). This operation is performed for the subsequent mail messages to the 6th mail message 6 corresponding to the number of mail messages (6). When all the unique IDs of the mail messages have been obtained, QUIT command is sent to the server 201 to disconnect the communication line.

In the example of FIG. 4, an error has occurred in the first and second mail messages 1 and 2, and the unique IDs of the mail messages 1 and 2 are registered in the table. The first mail message 1 is not deleted yet (flag 400=1) in the POP server 201.

Figure 6:
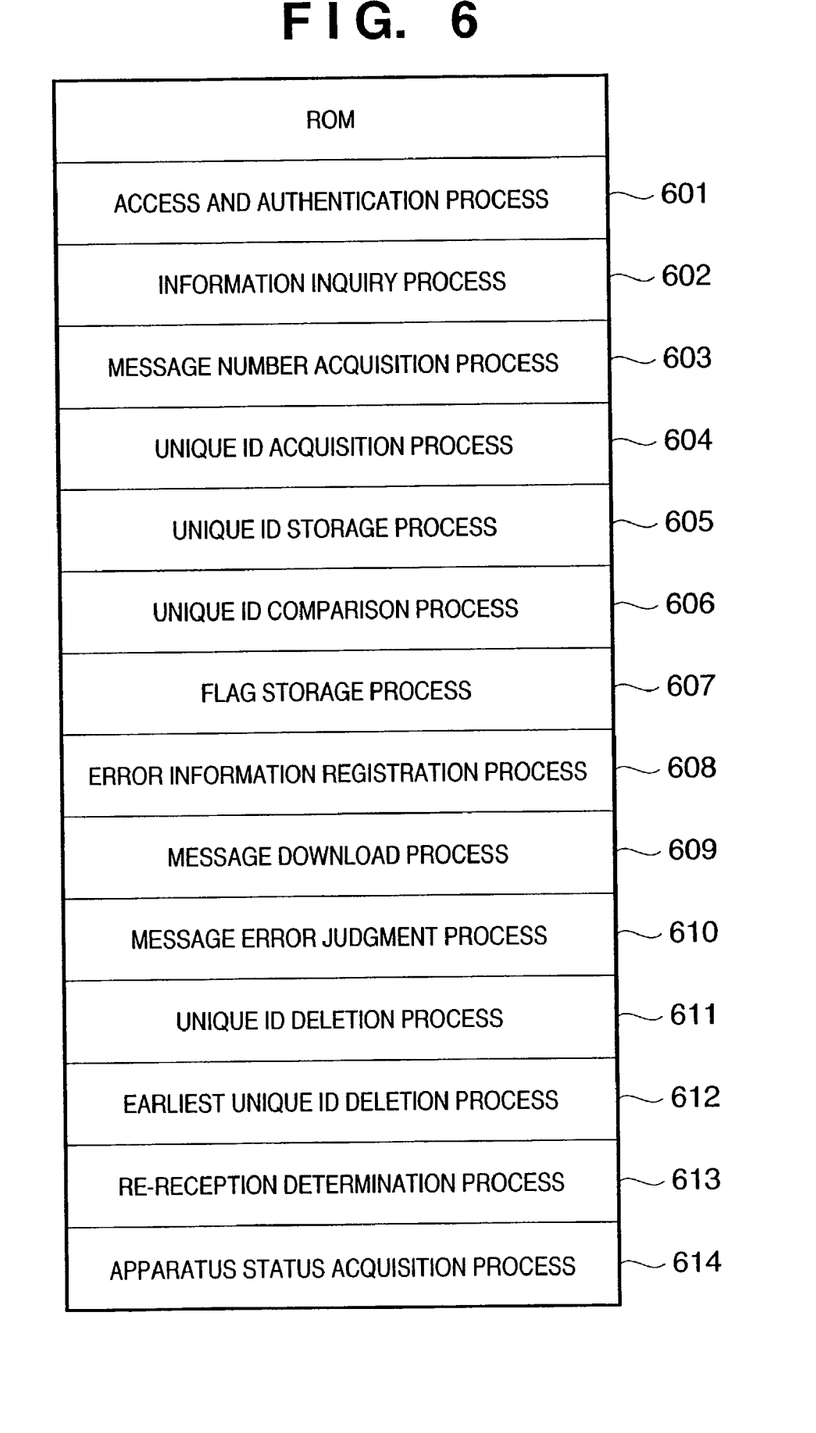
FIG. 6 is a table explaining a control program module stored in a ROM of the communication apparatus according to the embodiment.

FIG. 6 is a table showing the structure of the ROM 101 holding the control program executed by the communication apparatus 203 according to the present embodiment.

Numeral 601 denotes an area holding a process procedure module for accessing the POP3 server 201 from the communication apparatus 203 with the LAN interface 106, then performing account authentication after establishment of communication channel; 602, an area holding a process procedure module for making an inquiry about message information in the mail box from the communication apparatus 203 by using the POP3 STAT command, and determining whether or not message information exists; 603, an area holding a process procedure module for obtaining a message number from the communication apparatus 203 by using the POP3 LIST command; 604, an area holding a process procedure module for obtaining a unique ID of the message from the communication apparatus 203 by using the POP3 UIDL command; 605, an area holding a process procedure module for storing the obtained unique ID into the table (RAM 102); 606, an area holding a process procedure module for comparing the unique ID obtained by the process module 604 with the unique IDs registered in the table of the RAM 102; 607, an area holding a process procedure module for changing the flag corresponding to the unique ID in the table of the RAM 102 to "true" or "false"; 608, an area holding a process procedure module for storing information indicating the cause of error in correspondence with the unique ID; 609, an area holding a process procedure module for downloading the message from the POP3 server 201 by using the POP3 RETR command, including processing indicating whether or not the downloaded message is printable; 610, an area holding a process procedure module for determining an message error based on error information and performing printing by the printer 103; 611, an area holding a process procedure module for deleting a unique ID with a "false" flag from the table of the RAM 102; 612, an area holding a process procedure module for deleting data in a storage area of the earliest unique ID if the storage area for unique ID is insufficient; 613, an area holding a process procedure module for determining whether or not re-reception is to be performed based on information indicating the case of previous error and current status information of the apparatus 203; and 614, an area holding a process procedure module for obtaining the status of the apparatus 203.

Other Embodiment

In the above-described embodiment, one table as shown in FIG. 4 is provided, however, the table may be provided for each POP3 account.

Further, the object of the present invention can be also achieved by providing a storage medium holding software program code for realizing the functions of the above-described embodiments to a system or an apparatus, reading the program code with a computer (e.g., CPU, MPU) of the system or apparatus from the storage medium, then executing the program. In this case, the program code read from the storage medium realizes the functions according to the above-described embodiments, and the storage medium holding the program code constitutes the invention. Further, the storage medium, such as a floppy disk, a hard disk, an optical disk, a magneto-optical disk, a CD-ROM, a CD-R, a DVD, a magnetic tape, a nonvolatile type memory card, and ROM can be used for providing the program code.

Furthermore, besides aforesaid functions according to the above-described embodiments are realized by executing the program code which is read by a computer, the present invention includes a case where an OS (operating system) or the like working on the computer performs a part or entire actual processing in accordance with designations of the program code and realizes functions according to the above-described embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above-described embodiment.

As described above, according to the present embodiment, in a case where mail messages in the POP3 server connected to the network include an unprintable mail message, reception of the unprintable mail message is performed only once, and printing of error information is performed only once.

Further, according to the present embodiment, reception of the message data many times and printing upon each reception can be prevented.

Further, in a case where a reason why reception of an electronic mail is not permissible has been solved, the electronic mail becomes receivable.

Further, the storage area for error message ID can be effectively utilized, and a large memory capacity is not required. Further, the wasteful control to obtain message information of unique ID deleted from the server is prevented.

Further, it is determined whether or not a storage area for unique ID is sufficient, and if it is not sufficient, the earliest unique ID in the storage area is deleted, thereby message acquisition from the POP3 server is performed in the next cycle. Then if an error occurs, error information is outputted again. Accordingly, even if the administrator of the server 201 has forgotten to check unreceivable message, the administrator can be reminded of checking without printing error information every time.

Further, regarding a new unique ID of which a message has not been received, error information is not outputted upon each access to the server for message acquisition.

The present invention is not limited to the above embodiments and various changes and modifications can be made within the spirit and scope of the present invention. Therefore, to appraise the public of the scope of the present invention, the following claims are made.

What is claimed is:

1. A communication apparatus that communicates with a mail server via a network, comprising:
    an acquisition unit configured to acquire first identification information of a first mail message stored in the mail server;
    a reception unit configured to receive the first mail message from the mail server based on the first identification information acquired by said acquisition unit;
    a specifying unit configured to specify a reason why the first mail message received by said reception unit is unprocessible, in a case where the first mail message received by said reception unit is unprocessible;
    a registration unit configured to register the first identification information of the first mail message in correlation with information indicating the reason why the first mail message is unprocessible specified by said specifying unit;
    a comparison unit configured to compare the first identification information registered by the registration unit with second identification information of a second mail message which is acquired by said acquisition unit after acquiring the first identification information of the first mail message by said acquisition unit;
    a determination unit configured to determine, in a case where the first identification information registered by the registration unit coincides with the second identification information of the second mail message, and in a case where the information indicating the reason why the first mail message is unprocessible denotes a shortage of memory capacity of a memory that is provided in the communication apparatus and which is used for reception of mail messages, whether or not the memory capacity of the memory is sufficient for the reception of the second mail message corresponding to the second identification information;
    a control unit configured to control said reception unit to receive the second mail message corresponding to the second identification information, (1) in a case where the first identification information of the first mail message does not coincide with the second identification information of the second mail message, or (2) in a case where said determination unit determines that the memory capacity of the memory is sufficient for the reception of the mail message, and to control said reception unit not to receive the second mail message corresponding to the second identification information in a case where said determination unit determines that the memory capacity of the memory is not sufficient for the reception of the second mail message,
    wherein said control unit controls, in a case where the first identification information coincides with the second identification information, and where the information indicating the reason why the first mail message is unprocessible denotes a reason other than the shortage of memory capacity of the memory, said reception unit to receive the second mail message corresponding to the second identification information from the mail server regardless of whether or not the memory capacity of the memory is sufficient for the reception of the second mail message.

2. The communication apparatus according to claim 1, wherein said control unit permits the reception of all mail messages having identification information which does not coincide with the stored first identification information.

3. The communication apparatus according to claim 1, wherein said reception unit further has an authentication unit configured to perform authentication between the communication apparatus and the mail server.

4. The communication apparatus according to claim 1, further comprising a print unit configured to print mail messages received by said reception unit.

5. The communication apparatus according to claim 4, further comprising a print control unit configured to, in a case where the received mail message is unprocessible, cause said print unit to print an error message.

6. The communication apparatus according to claim 5, wherein if said control unit controls said reception unit not to receive mail messages having the same identification information as the registered first identification information a predetermined number of times, said print control unit causes said print unit to print an error message.

7. The communication apparatus according to claim 1, wherein said control unit further controls a number of items of identification information registered in said registration unit so as not to be equal to or greater than a predetermined value.

8. A communication control method of a communication apparatus that communicates with a mail server via a network, comprising:
    an acquisition step of acquiring first identification information of a first mail message stored in the mail server;
    a reception step of receiving the first mail message from the mail server based on the first identification information acquired in said acquisition step;
    a specifying step of specifying a reason why the first mail message received in said reception step is unprocessible, in a case where the first mail message received in said reception step is unprocessible;
    a registration step of registering the first identification information of the first mail message in correlation with information indicating the reason why the first mail message is unprocessible specified in said specifying step;
    a comparison step of comparing the first identification information registered in the registration step with second identification information of a second mail message which is acquired in said acquisition step after acquiring the first identification information of the first mail message in said acquisition step;
    a determination step of determining, in a case where the first identification information registered in the registration step coincides with the second identification information of the second mail message, and in a case where the information indicating the reason why the first mail message is unprocessible denotes a shortage of memory capacity of a memory that is provided in the communication apparatus and which is used for reception of mail messages, whether or not the memory capacity of the memory is sufficient for the reception of the second mail message corresponding to the second identification information;
    a control step of controlling said reception step to receive the second mail message corresponding to the second identification information, (1) in a case where the first identification information registered in the registration step does not coincide with the second identification information of the second mail message, or (2) in a case where said determination step determines that the memory capacity of the memory is sufficient for the reception of the second mail message, and controlling said reception step not to receive the second mail message corresponding to the second identification information in a case where said determination step determines that the memory capacity of the memory is not sufficient for the reception of the second mail message, wherein said control step controls, in a case where the first identification information coincides with the second identification information, and where the information indicating the reason why the first mail message is unprocessible denotes a reason other than the shortage of memory capacity of the memory, said reception step to receive the second mail message corresponding to the second identification information from the mail server regardless of whether or not the memory capacity of the memory is sufficient for the reception of the second mail message.

9. The communication control method according to claim 8, wherein said control step permits the reception of all mail messages having identification information which does not coincide with the stored first identification information.

10. The communication control method according to claim 8, wherein said reception step further has an authentication step of performing authentication between the communication apparatus and the mail server.

11. The communication control method according to claim 8, further comprising a print step of printing mail messages received in said reception step.

12. The communication control method according to claim 11, further comprising a print control step of, in a case where the received mail message is unprocessible, printing an error message.

13. The communication control method according to claim 8, wherein said control step further comprises a step of controlling a number of items of identification information registered in said registration step so as not to be equal to or greater than a predetermined value.

14. The communication control method according to claim 8, further comprising a step of printing an error message, if the reception of a mail message having the same identification information as the stored first identification information is inhibited a predetermined number of times.

15. A computer-readable storage medium on which is stored a computer-executable program for causing a computer to execute a communication control method of a communication apparatus that communicates with a mail server via a network, the program comprising:

an acquisition step of acquiring first identification information of a first mail message stored in the mail server;

a reception step of receiving the first mail message from the mail server based on the first identification information acquired in said acquisition step;

a specifying step of specifying a reason why the first mail message received in said reception step is unprocessible, in a case where the first mail message received in said reception step is unprocessible;

a registration step of registering the first identification information of the first mail message in correlation with information indicating the reason why the first mail message is unprocessible specified in said specifying step;

a comparison step of comparing the first identification information registered in the registration step with second identification information of a second mail message which is acquired in said acquisition step after acquiring the first identification information of the first mail message in said acquisition step;

a determination step of determining, in a case where the first identification information registered in the registration step coincides with the second identification information of the second mail message, and in a case where the information indicating the reason why the first mail message is unprocessible denotes a shortage of memory capacity of a memory that is provided in the communication apparatus and which is used for reception of mail messages, whether or not the memory capacity of the memory is sufficient for the reception of the second mail message corresponding to the second identification information;

a control step of controlling said reception step to receive the second mail message corresponding to the second identification information, (1) in a case where the first identification information registered in the registration step does not coincide with the second identification information of the second mail message, or (2) in a case where said determination step determines that the memory capacity of the memory is sufficient for the reception of the second mail message, and controlling said reception step not to receive the second mail message corresponding to the second identification information in a case where said determination step determines that the memory capacity of the memory is not sufficient for the reception of the second mail message, wherein said control step controls, in a case where the first identification information coincides with the second identification information, and where the information indicating the reason why the first mail message is unprocessible denotes a reason other than the shortage of memory capacity of the memory, said reception step to receive the second mail message corresponding to the second identification information from the mail server regardless of whether or not the memory capacity of the memory is sufficient for the reception of the second mail message.

* * * * *